(12) United States Patent
Britton (10) Patent No.: US 12,496,504 B2
(45) Date of Patent: Dec. 16, 2025

(54) BICYCLE TRAINER TORQUE MEASUREMENT DEVICE

(71) Applicant: SRAM, LLC, Chicago, IL (US)

(72) Inventor: Owen Britton, Spearfish, SD (US)

(73) Assignee: SRAM, LLC, Chicago, IL (US)

( * ) Notice: Subject to any disclaimer, the term of this patent is extended or adjusted under 35 U.S.C. 154(b) by 168 days.

(21) Appl. No.: 18/185,044

(22) Filed: Mar. 16, 2023

(65) Prior Publication Data

US 2024/0189687 A1    Jun. 13, 2024

Related U.S. Application Data (60) Provisional application No. 63/431,939, filed on Dec. 12, 2022.

(51) Int. Cl.
*A63B 69/16*        (2006.01)

(52) U.S. Cl.
CPC ........ *A63B 69/16* (2013.01); *A63B 2069/165* (2013.01); *A63B 2209/08* (2013.01); *A63B 2220/54* (2013.01)

(58) Field of Classification Search
CPC .............. A63B 69/16; A63B 2069/165; A63B 2209/08; A63B 2220/54; A63B 21/0051; A63B 21/0058; A63B 21/005; A63B 2220/80; A63B 2220/833; A63B 2225/50; B62J 45/421; B62J 45/411
See application file for complete search history.

(56) References Cited

U.S. PATENT DOCUMENTS

| | | | |
|---|---|---|---|
| 5,027,303 A  * | 6/1991 | Witte | B62J 45/421 482/901 |
| 5,560,266 A | 10/1996 | Shikimori et al. | |
| 5,894,094 A | 4/1999 | Kuchler et al. | |
| 5,900,703 A | 5/1999 | Li | |
| 6,038,933 A | 3/2000 | Meyer | |
| 6,173,801 B1 | 1/2001 | Kakutani et al. | |
| 6,230,555 B1 | 5/2001 | Doerrie et al. | |
| 6,418,797 B1 | 7/2002 | Ambrosina et al. | |
| 6,447,421 B1 | 9/2002 | Wren | |
| 6,487,932 B2 * | 12/2002 | McIlraith | B62M 3/00 74/594.1 |
| 6,557,657 B2 | 5/2003 | Persson | |
| 6,935,157 B2 | 8/2005 | Miller | |
| 7,024,948 B2 | 4/2006 | Eilersen | |
| 7,047,817 B2 | 5/2006 | Lanham | |
| 7,240,586 B2 | 7/2007 | Wu | |
| 7,975,561 B1 | 7/2011 | Ambrosina et al. | |
| 8,505,393 B2 | 8/2013 | Meyer et al. | |

(Continued)

FOREIGN PATENT DOCUMENTS

| CN | 1297528 | 5/2001 |
|---|---|---|
| CN | 201323513 Y | 10/2009 |

(Continued)

*Primary Examiner* — Andrew M Kobylarz (57) ABSTRACT

A bicycle trainer having a device for direct measurement of torque through a stator of a generator style resistance unit of a bicycle trainer is provided. The direct measurement may be accomplished through the disposition of strain gauges on a device positioned at the intersection of a stator and rigid frame attachment of the generator style resistance unit. The strain gauges may be disposed on radially extending spokes of the stator, or a carrier therefore.

11 Claims, 11 Drawing Sheets

(56) References Cited

U.S. PATENT DOCUMENTS

| | | |
|---|---|---|
| 8,584,529 B2 | 11/2013 | Fisher et al. |
| 8,689,645 B2 | 4/2014 | Watarai et al. |
| 8,800,389 B2 | 8/2014 | Tetsuka et al. |
| 8,881,608 B2 | 11/2014 | Tetsuka et al. |
| 8,984,962 B2 | 3/2015 | Christmann |
| 9,182,304 B2 | 11/2015 | Namiki et al. |
| 9,784,628 B1 | 10/2017 | Jennings et al. |
| 9,999,818 B2 | 6/2018 | Hawkins |
| 10,617,913 B2 | 4/2020 | Dhawan |
| 2005/0132820 A1 | 6/2005 | Eilersen |
| 2005/0178210 A1 | 8/2005 | Lanham et al. |
| 2006/0037409 A1 | 2/2006 | Ichige |
| 2006/0082090 A1 | 4/2006 | Constans |
| 2009/0043534 A1 | 2/2009 | Prestidge et al. |
| 2009/0119032 A1 | 5/2009 | Meyer |
| 2009/0120210 A1 | 5/2009 | Phillips et al. |
| 2010/0263468 A1 | 10/2010 | Fisher |
| 2012/0017701 A1 | 1/2012 | Meyer et al. |
| 2012/0285264 A1 | 11/2012 | Sasaki et al. |
| 2013/0024137 A1 | 1/2013 | Grassi |
| 2013/0104650 A1 | 5/2013 | Bailey et al. |
| 2013/0233092 A1 | 9/2013 | Tetsuka et al. |
| 2013/0233126 A1 | 9/2013 | Tetsuka et al. |
| 2014/0171272 A1* | 6/2014 | Hawkins, III ..... A63B 24/0087 482/61 |
| 2014/0283622 A1 | 9/2014 | Namiki et al. |
| 2015/0082939 A1 | 3/2015 | Meyer et al. |
| 2017/0292881 A1 | 10/2017 | Jennings et al. |
| 2017/0307036 A1 | 10/2017 | Nuesser et al. |
| 2020/0063793 A1* | 2/2020 | Rossberger ............. B62M 6/50 |
| 2020/0298053 A1* | 9/2020 | Meyer ................ A63B 21/0052 |

FOREIGN PATENT DOCUMENTS

| | | |
|---|---|---|
| CN | 103496427 | 1/2014 |
| CN | 103587640 | 2/2014 |
| CN | 104512514 | 4/2015 |
| CN | 204758183 U | 11/2015 |
| EP | 1466824 | 10/2004 |
| EP | 3475674 | 5/2019 |
| ES | 1074760 U | 6/2011 |
| JP | 2014198505 | 10/2014 |
| TW | I426251 | 2/2014 |
| TW | I478844 | 4/2015 |
| TW | 201801767 | 1/2017 |
| TW | M624736 | 3/2022 |
| WO | 2011074947 | 6/2011 |
| WO | 2016030768 | 3/2016 |
| WO | 2017222395 | 12/2017 |

* cited by examiner

BICYCLE TRAINER TORQUE MEASUREMENT DEVICE

This application claims the benefit of U.S. Provisional Application No. 63/431,939, filed Dec. 12, 2022 and entitled "Bicycle Trainer Torque Measurement Device," the entire disclosure of which is hereby incorporated herein by reference.

FIELD OF THE DISCLOSURE

The present application generally relates to bicycle trainer having a torque measurement device, a torque cell and methods for assembling and using the bicycle trainer.

BRIEF BACKGROUND

Bicycle trainers are known in the art and are typically used for stationary indoor training on a bicycle. Dynamic electronic controlled, or smart, indoor bicycle trainers are becoming a popular method for training. It is desirable to have the same accuracy of power measurement in smart bicycle trainers as is available on modern traditional bicycles.

There are multiple methods for creating resistance to bicycle trainers. Two popular methods for creating resistance are accomplished through the use of an eddy current brake on a driven flywheel and by an electric motor styled generator resistance device. Eddy current brakes create resistance when a conductive material in relative motion passes by a magnet. The magnet may be permanent, however some smart trainers use an electromagnet to vary that amount of magnetism, thus varying the resistance the user feels. In such eddy current systems, the amount of electrical current supplied to the electromagnet may be used to estimate the torque provided by the eddy current system. With an accurate cadence measurement, this torque may then be used to calculate the power being supplied by the rider.

Typical electric generator resistance device trainers require a more sophisticated method to create resistance, but still use an electric current based measurement to estimate torque provided by the trainer. Again, this torque may be used with a cadence to calculate power. Electric generator trainers are faster to react than eddy current trainers to commanded changes in torque, leading to a more realistic indoor riding experience.

This disclosure provides a trainer, as well as a device to be used therein or therewith, to more accurately measure torque in a bicycle trainer.

SUMMARY

In one aspect, one embodiment of a bicycle trainer includes a base defining a rotation axis and a support having an inner portion non-rotatably fixed to the base, an outer portion radially spaced from the inner portion and a first face member extending radially between the inner portion and the outer portion. A stator is connected to the outer portion of the support and includes a plurality of circumferentially spaced electromagnets radially spaced from the rotation axis. A rotor is rotatably mounted to the base, wherein the rotor includes at least one magnet disposed radially outward of the electromagnets and a second face member axially spaced from the first face member, wherein the rotor is rotatable relative to the stator about the rotation axis. At least one strain measurement device is disposed on one of the first face member and/or the second face member. In one embodiment, the strain measurement device includes a shear stain gauge.

In another aspect, one embodiment of a torque cell for measuring torque applied to a rotor of an electric motor includes a radially outer stator attachment portion configured for attachment to a stator of the electric motor and a radially inner fixation portion configured for securing the torque cell in a non-rotational manner. A torque measurement device includes a face member disposed between and connecting the stator attachment portion and the fixation portion. The torque measurement device includes at least one strain measurement device configured to measure a strain of the face member connecting the stator attachment portion to the fixation portion.

In yet another aspect, one embodiment of a bicycle trainer includes a frame non-rotatably supporting an axle defining a rotation axis and a torque cell having a first inner portion non-rotatably fixed relative to the axle, a first outer portion radially spaced from the first inner portion and a first annular web extending radially between the first inner portion and the first outer portion. A stator is connected to the first outer portion of the torque cell and includes a plurality of circumferentially spaced electromagnets radially spaced from the rotation axis. A rotor includes a second inner portion rotatably mounted on the axle, a second outer portion comprising a plurality of magnets disposed radially outward of the electromagnets and a second annular web extending radially between the second inner portion and the second outer portion. At least one strain measurement device is disposed on the first annular web.

In one embodiment, a bicycle trainer having a device for direct measurement of torque through a stator of a generator style resistance unit of a bicycle trainer is provided. The direct measurement may be accomplished through the disposition of strain gauges on a device positioned at the intersection of a stator and rigid frame attachment of the generator style resistance unit. In various embodiments, the strain gauges may be disposed at or on radially extending spokes of the stator, or a carrier therefore.

The various embodiments of the bicycle trainer, torque cell and methods for the use and assembly thereof provide significant advantages over other bicycle trainers, torque cells, and methods. For example, and without limitation, the bicycle trainer, torque cell and method provide for the direct measurement of strain, rather than extrapolation from the measurement of an electrical current. The direct strain measurement, for example as incorporated into an electric generator resistance system, combines the benefits of a realistic indoor riding experience with the increased power measurement accuracy available through the direct measurement of torque in a system, for example through the use of strain measurement techniques.

The foregoing paragraphs have been provided by way of general introduction and are not intended to limit the scope of the claims presented below. The various preferred embodiments, together with further advantages, will be best understood by reference to the following detailed description taken in conjunction with the accompanying drawings.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

It should be understood that the term "plurality," as used herein, means two or more. The term "longitudinal," as used herein means of or relating to a length or lengthwise direction. The term "lateral," as used herein, means situated on, directed toward or running in a side-to-side direction. The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components. The terms "upper," "lower," "rear," "front," "fore," "aft," "vertical," "horizontal," "right," "left," "inboard," "outboard" and variations or derivatives thereof, refer to the orientations of an exemplary bicycle 50, shown in FIG. 1, from the perspective of a user seated thereon, for example with an "inboard" component or feature being closer to a vertical mid-plane of the bicycle extending in a direction A. The term "transverse" means non-parallel. The terms "outer" and "outwardly" refers to a direction or feature facing away from a centralized location, for example the phrases "radially outwardly," "radial direction" and/or derivatives thereof, refer to a feature diverging away from a centralized location, for example a rotation axis 4 of the rotor as shown in FIG. 2. Conversely, the terms "inward" and "inwardly" refers to a direction facing toward the centralized or interior location. The term "subassembly" refers to an assembly of a plurality of components, with subassemblies capable of being further assembled into other subassemblies and/or a final assembly, such as the bicycle trainer.

Figure 1:
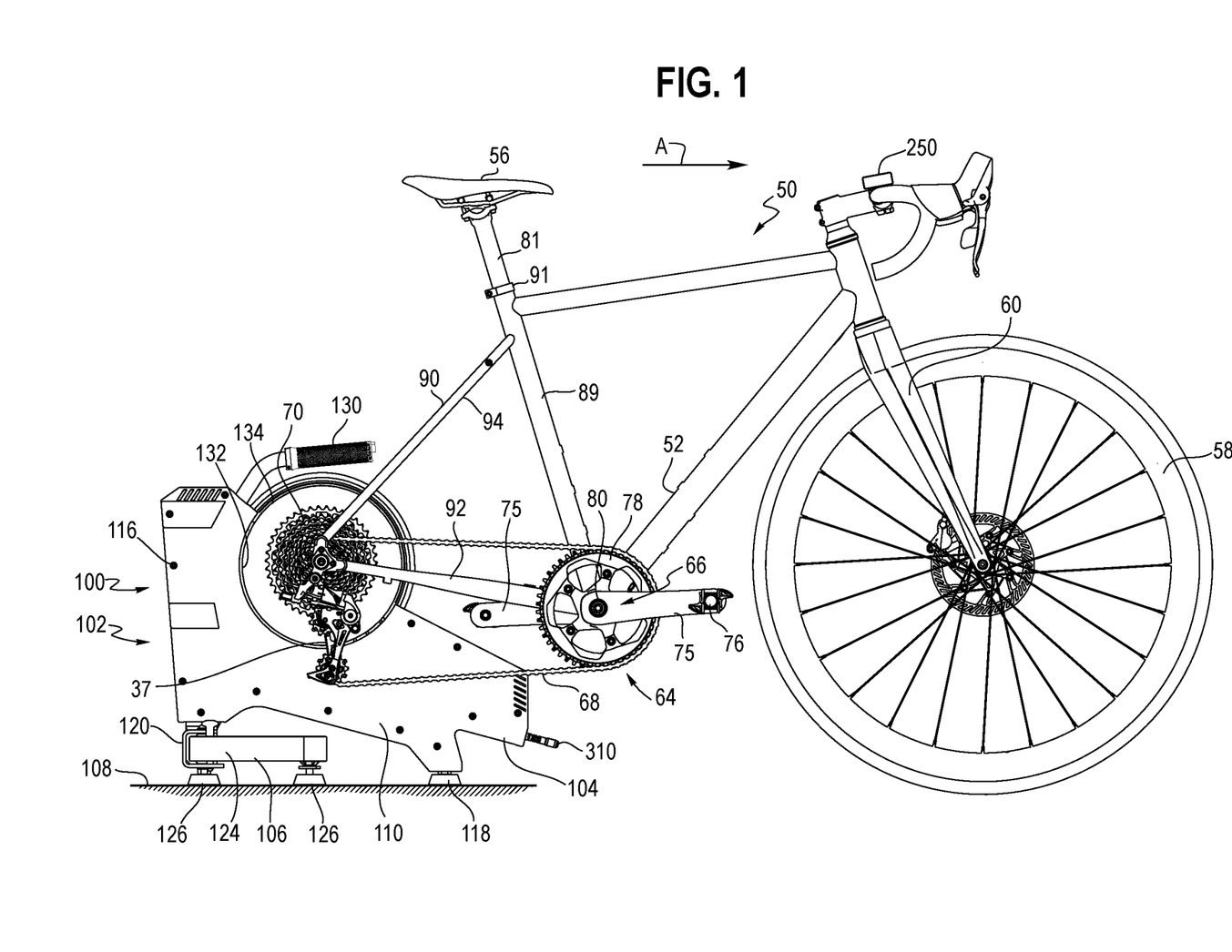
FIG. 1 is a side view of a bicycle coupled to one embodiment of a bicycle trainer with a cassette mounted thereon.
Figure 2:
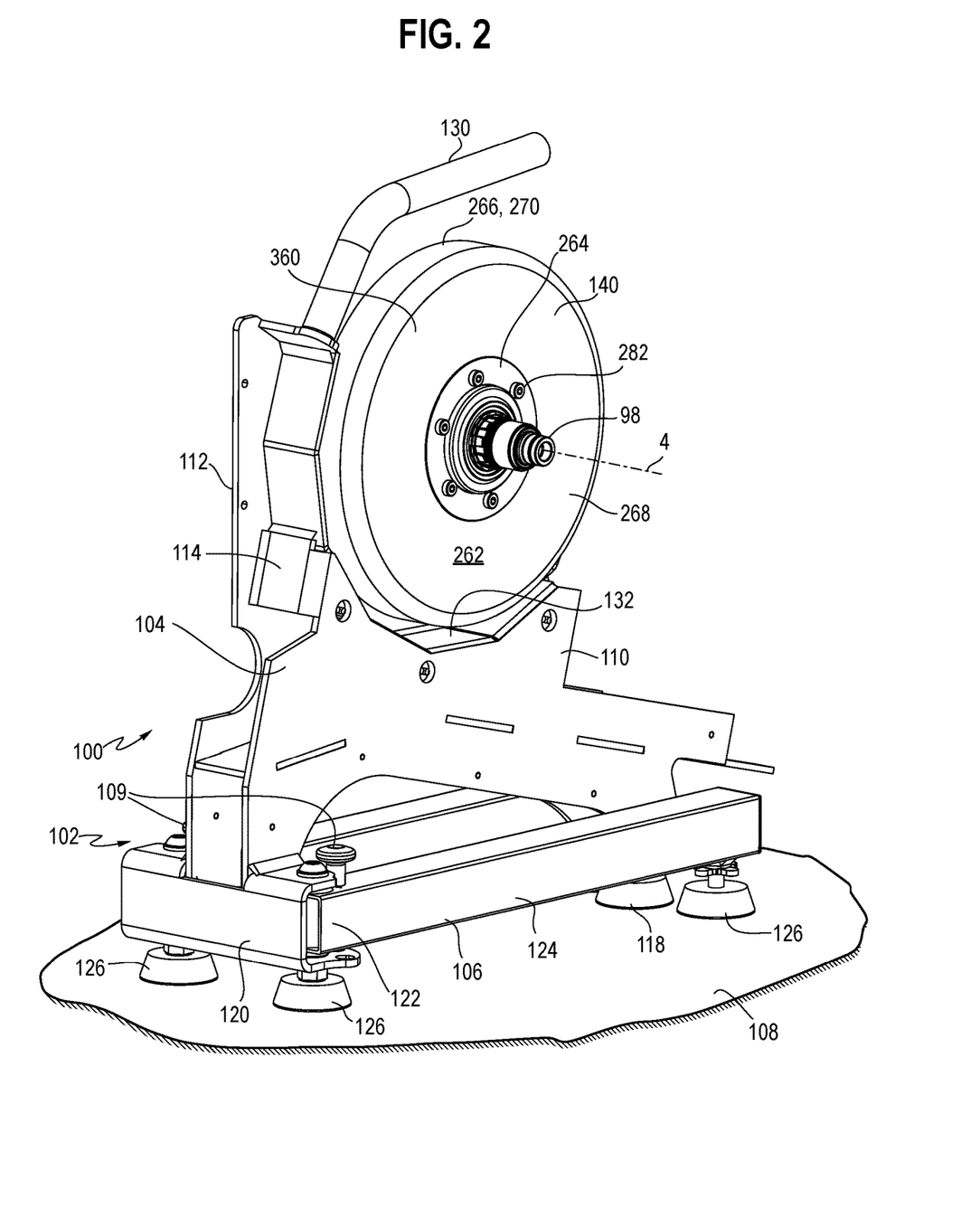
FIG. 2 is a right side perspective view of one embodiment of a bicycle trainer without a cassette mounted thereon.

FIG. 1 illustrates one example of a human powered vehicle. In this example, the vehicle is one possible type of bicycle 50, such as a road bicycle. The bicycle 50 has a frame 52, handlebars 54 near a front end of the frame, and a seat or saddle 56 for supporting a rider over a top of the frame. The bicycle 50 also has a first or front wheel 58 carried by a front fork subassembly 60 supporting the front end of the frame. The bicycle 50 also has a rear end 90 of the frame, ordinarily supported by a rear wheel, but in this embodiment is supported by a bicycle trainer 100. The rear end may include a pair of chain stays 92 and a pair of seat stays 94. The bicycle 50 also has a drive train 64 with a crank assembly 66 that is operatively coupled via a roller chain 68 to a rear cassette 70 or a driven sprocket assembly that is rotatably mounted on an axle 98 extending outwardly from the trainer and defining the rotation axis 4. The crank assembly 66 includes at least one, and typically two, crank arms 75 and pedals 76, along with a front chainring assembly 78 or a drive sprocket assembly. A crank spindle or shaft may connect the two crank arms. The crank shaft defines a center rotational axis of the chainring assembly 78. The crank assembly 66 may also include other components.

A rear gear change device 37, such as a derailleur, is mounted on the rear end 90 of the frame to move the roller chain 68 through different sprockets of the cassette 70. In one embodiment, a front gear changer device (not shown), such as a derailleur, may be provided to move the chain 68 through multiple sprockets of the chainring assembly. In the illustrated example, the saddle 56 is supported on a seat post 81 having an end portion received in a top of a frame seat tube 89 of the frame. A clamping ring 91 may be tightened to secure the upper seat tube 81 to the lower frame seat tube 89.

As shown in FIGS. 1-7, the bicycle trainer 100 includes a base 102 having a frame 104 and a leveling support 106 engaging the floor 108, or other support surface, and supporting the frame. In one embodiment, the frame 104 includes a pair or laterally spaced and vertically oriented plates 110, 112. A spacer 114, configured as a web, is disposed between the plates 110, 112, which are secured to each other and the spacer 114 with a plurality of fasteners 116. A front portion of the frame 104 includes a foot 118 that engages the floor. A rear portion of the frame is configured as a C-channel 120 disposed around a rear portion 122 of the leveling support 106. The leveling support 106 may include a U-shaped structural component 124, having a pair of spaced apart arms 128 defining a gap therebetween, with a pair of height adjustable feet 126 disposed at each of the front and rear of the support. The foot 118, which is height adjustable foot, is disposed in the space between the arms 128. The height adjustable feet 118, 126 may be adjusted, for example by rotating a nut threadably engaged with a shaft extending from the foot, or vice versa. In this way, the front and rear portions of the leveling support 106, or the front portion of the frame 104, may be adjusted vertically such that the base sits level on the support surface 108. A pair of latches 109 include an actuation knob, which may be grasped and pulled to release the leveling supports 106 from the frame 104, which may be rotated between a folded and deployed position. Each latch 109 may engage one more openings in the C-channel 120 to fix the rotation between the frame 104 and the support 106.

A handle 130 may be coupled to the frame, for example the spacer 114 as shown in FIG. 2, and extend forwardly and above the center of gravity of the bicycle trainer 100. In other embodiments, the handle 130 may be attached to one or both of the plates, and/or to the spacer. The plate 110 on the right side of the trainer, together with the spacer 114, may have a circumferential boundary 132 having a concave shape, which is shaped to be radially spaced apart from an outer circumferential surface 134 of a rotor 140 rotatably mounted on the axle and rotatably around the axis. The boundary 132 may be smooth, as shown in FIG. 1, or may be configured with a plurality of liner segments as shown in FIG. 2.

Figure 3:
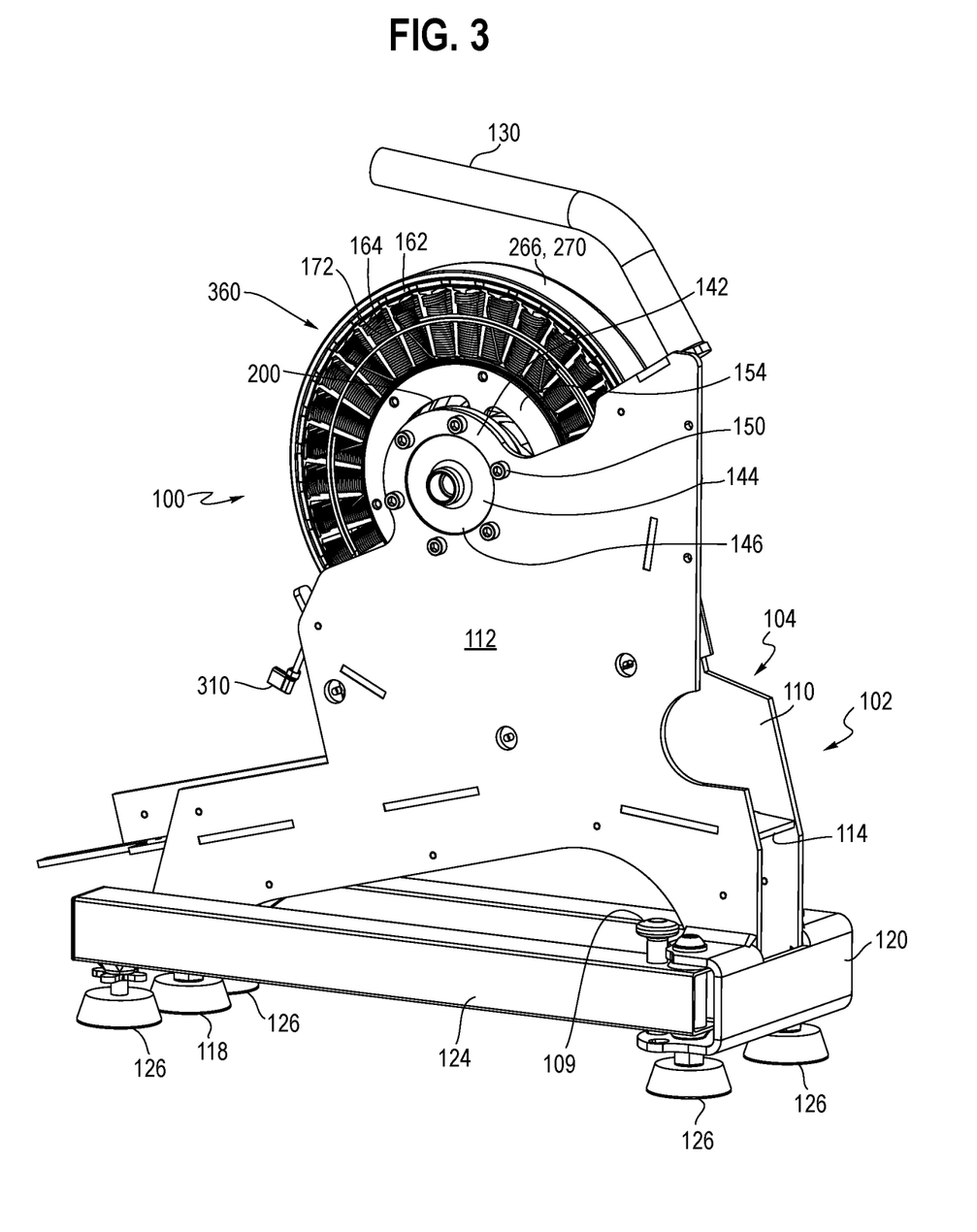
FIG. 3 is a left side perspective view of the bicycle trainer shown in FIG. 2.
Figure 4:
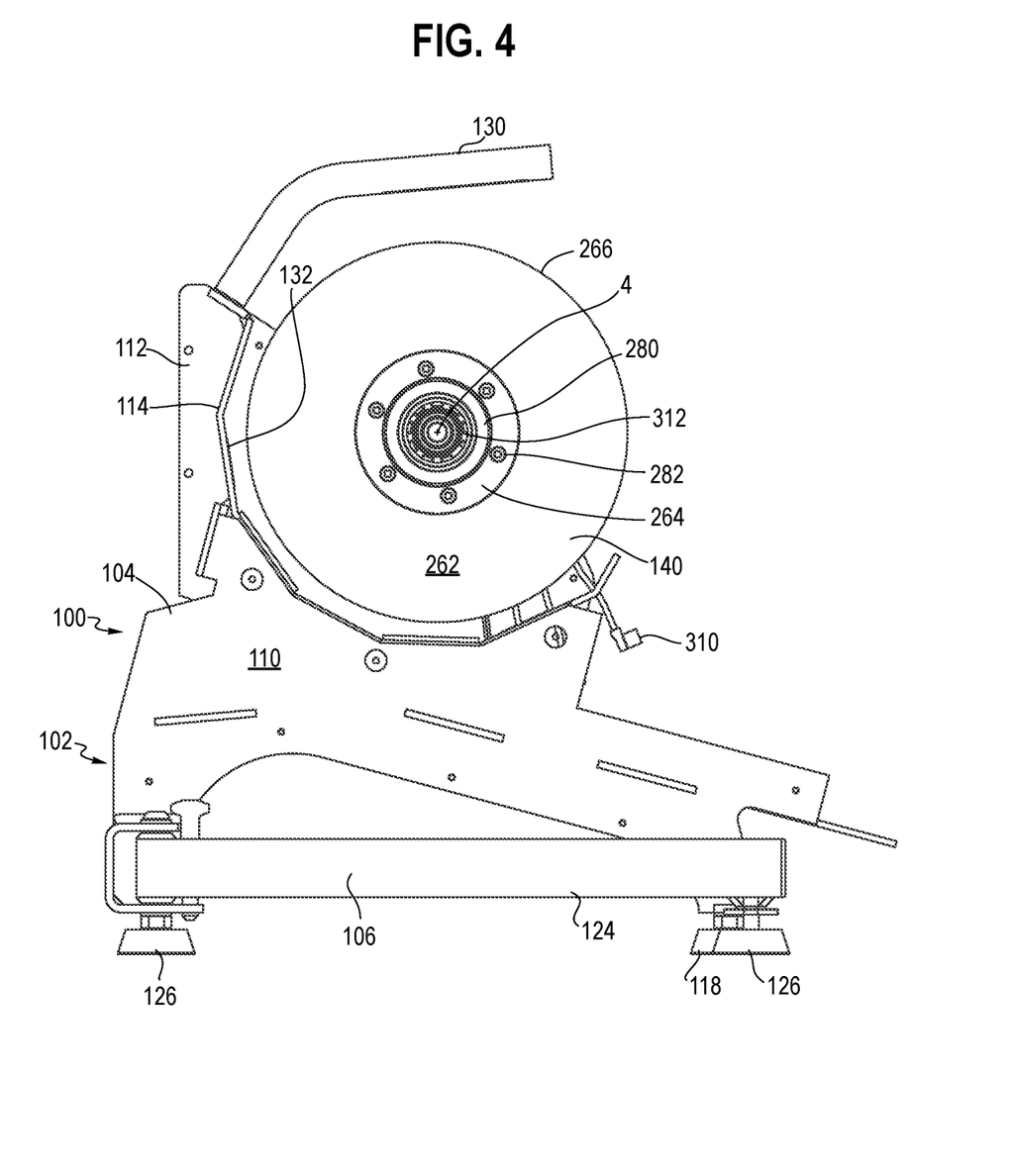
FIG. 4 is a right side view the bicycle trainer shown in FIG. 2.
Figure 5:
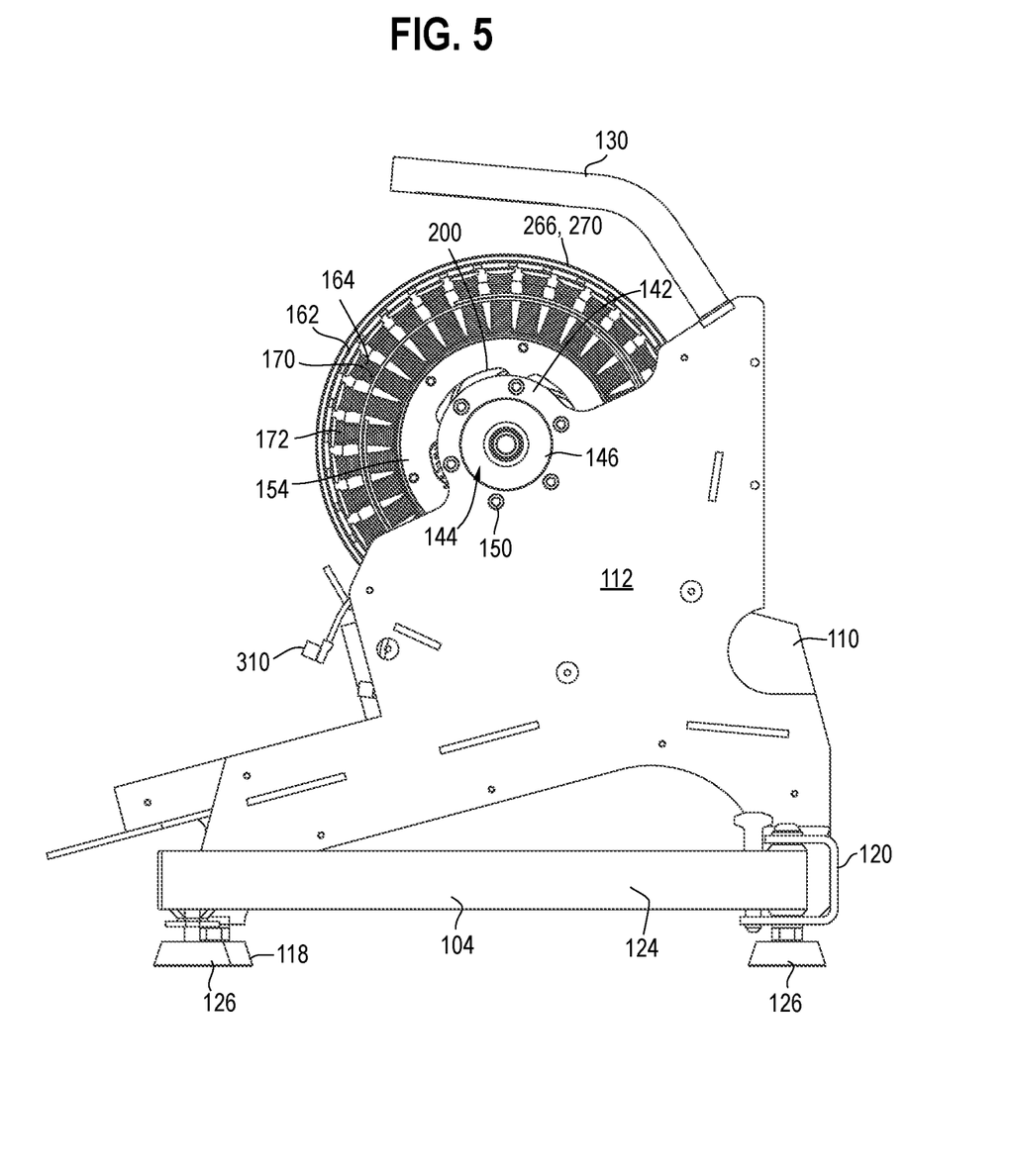
FIG. 5 is a left side view of the bicycle trainer shown in FIG. 2.
Figures 9A, 9B:
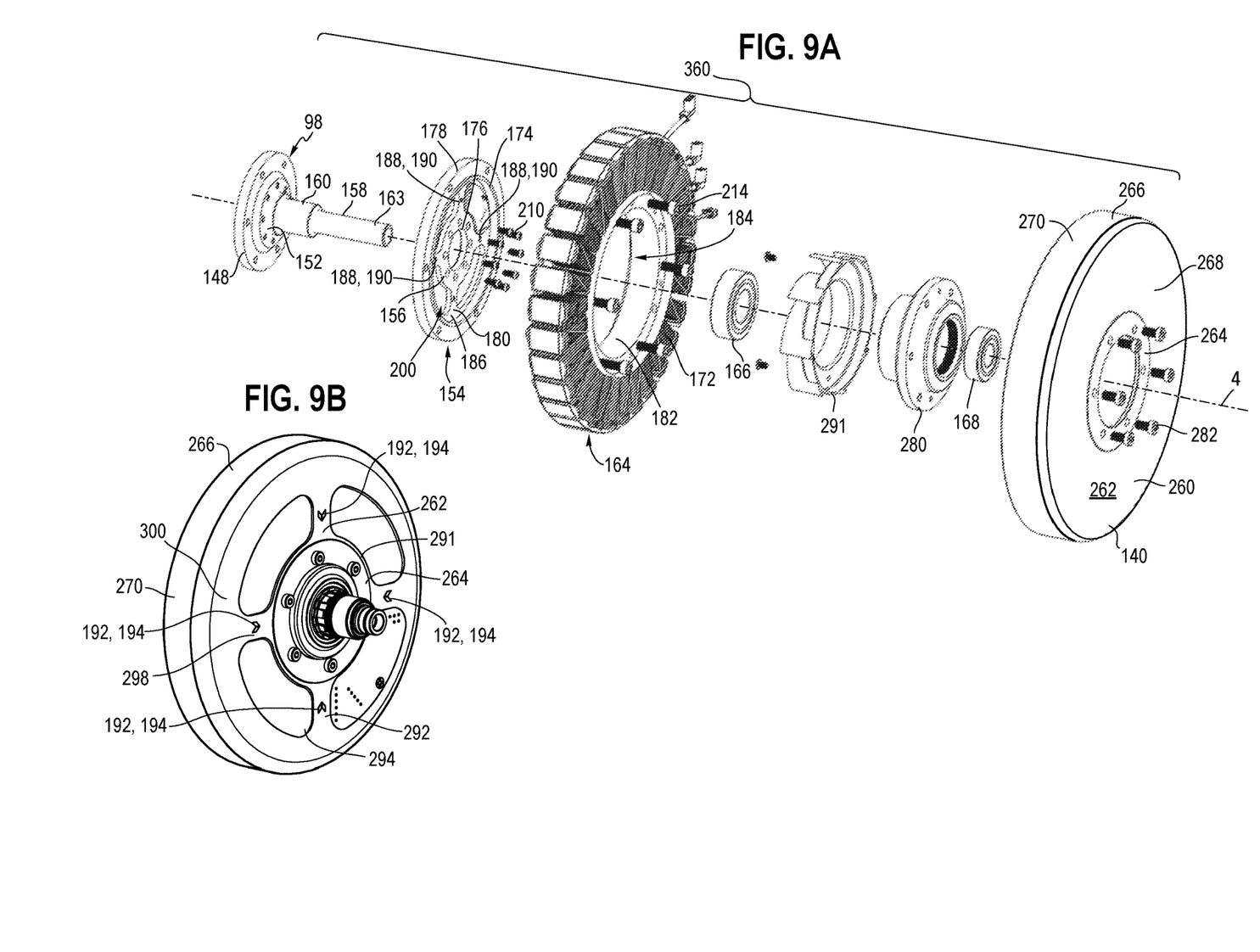
FIG. 9A is an exploded perspective view of a portion of the bicycle trainer shown in FIG. 2.
FIG. 9B is a perspective view of an alternative embodiment of a rotor.
Figure 10:
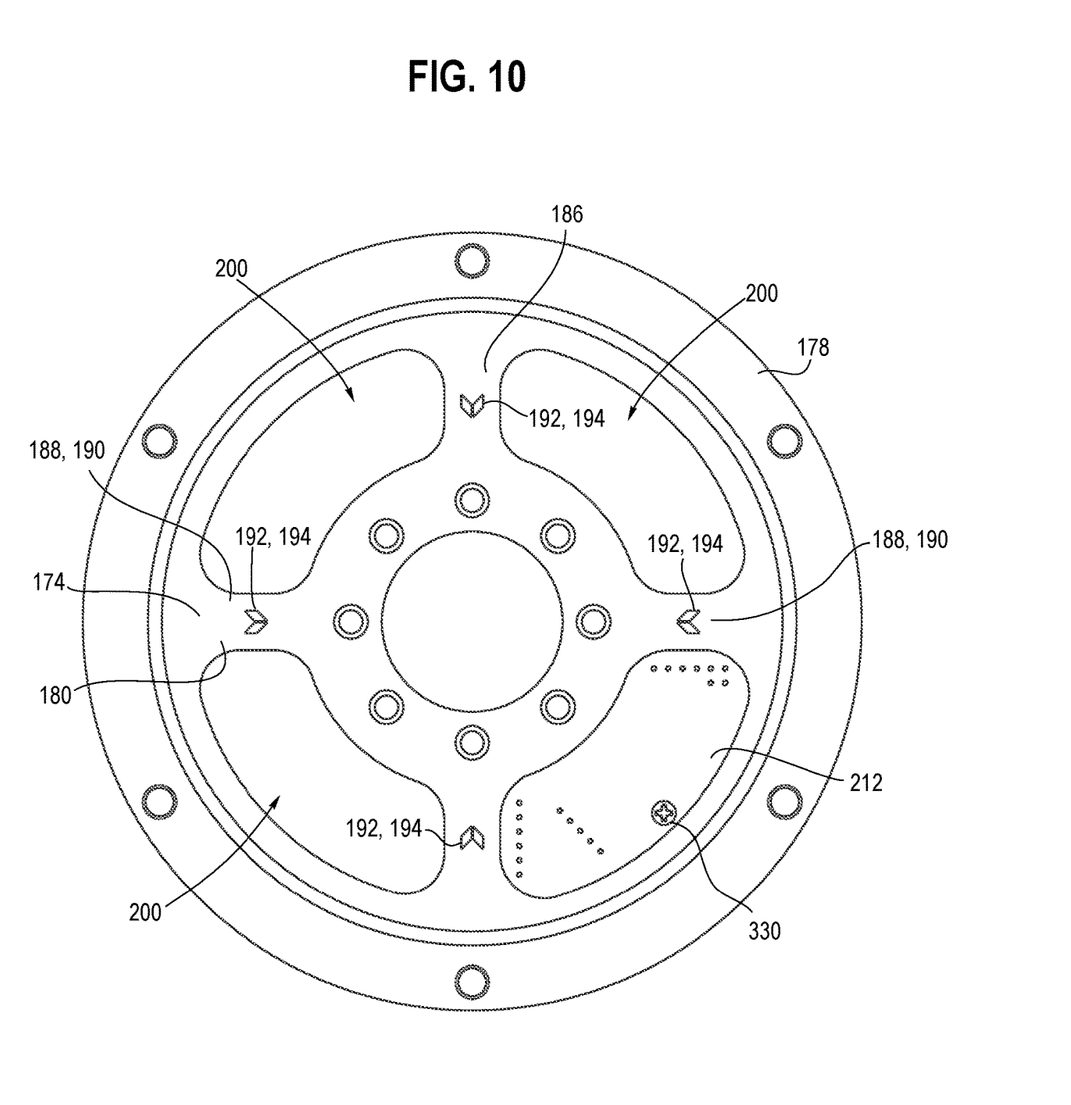
FIG. 10 is a side view of one embodiment of a torque cell.

In one embodiment, the axle 98 is non-rotatably fixed to the frame 104, and in particular to a hub portion 142 of the plate 112 on the left side of the frame, with the hub portion 142 having a central opening 144 that receives a boss portion 146 of the axle as shown in FIGS. 3 and 5. Referring to FIG. 9A, the axle 98 includes an outer radial hub 148 fixedly coupled to the hub portion of the frame, for example with a plurality of fasteners 150, such as bolts. The hub may alternatively be directly fixed to the frame with other connectors, such as welding and the like. The axle 98 includes an inner radial hub 152 that is non-rotatably fixed to the inner portion of a torque cell 154, configured as a hub 156, such that the inner portion, or hub, is non-rotatably connected to the hub 152 and frame 104. The axle 98 further includes a shaft 158 extending laterally from the hubs and defining the rotation axis. The shaft 158 may have first and second portions 160, 163 with different diameters.

Figure 6:
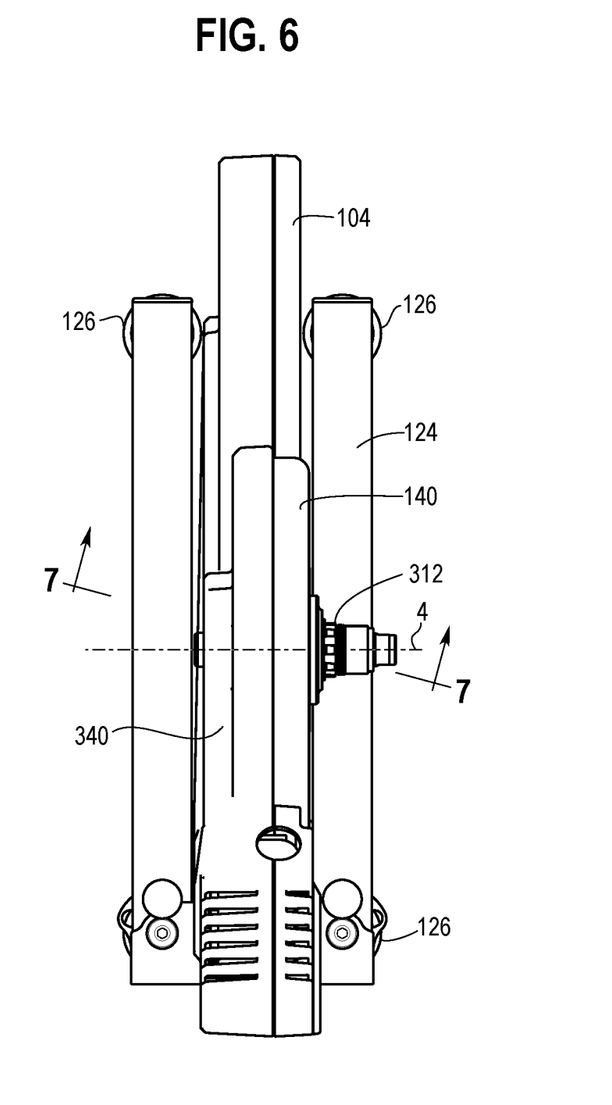
FIG. 6 is a top view of the bicycle trainer shown in FIG. 1 without a cassette mounted thereon.
Figure 7:
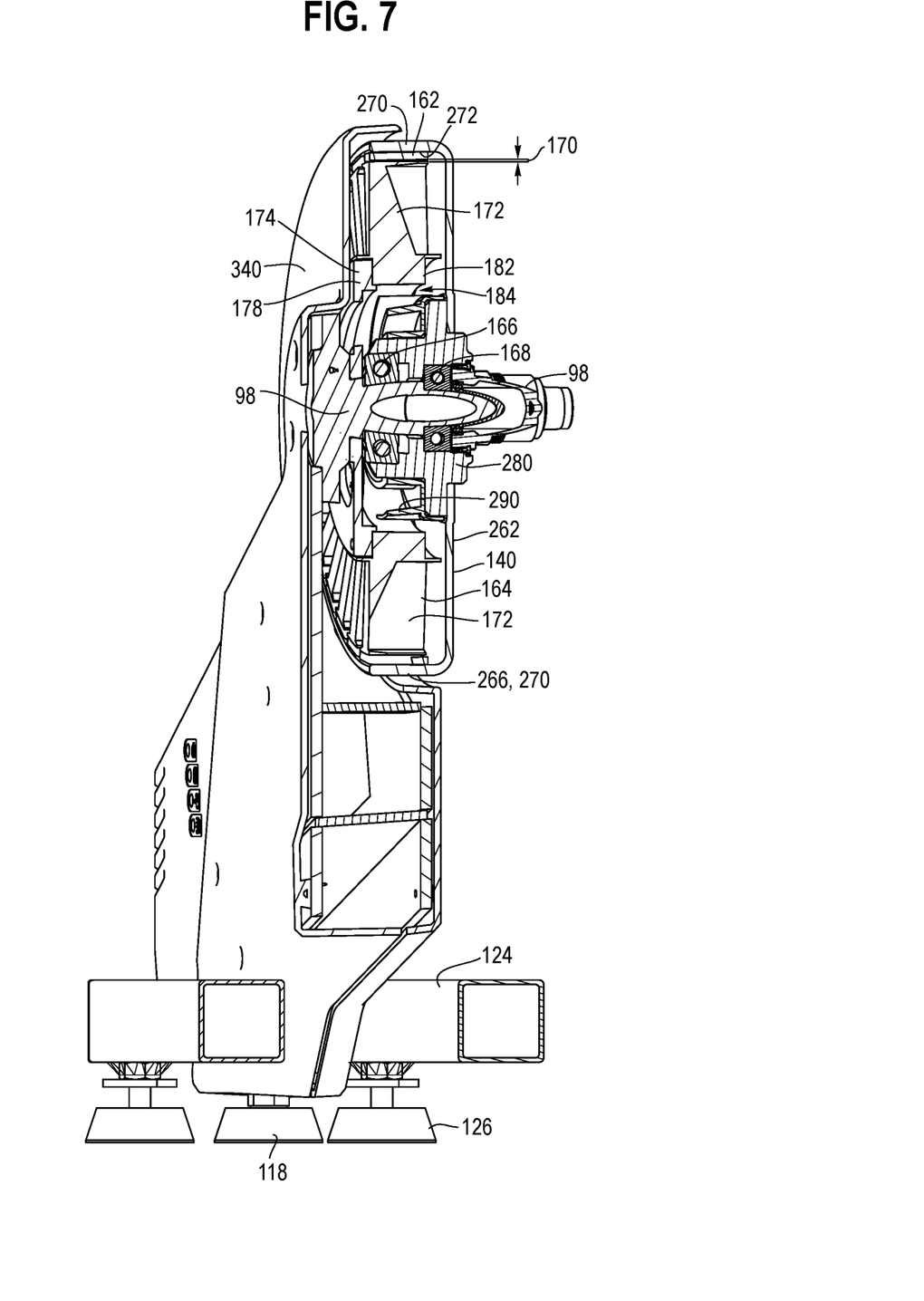
FIG. 7 is a cross-sectional view of the bicycle trainer shown in FIG. 6.
Figure 8:
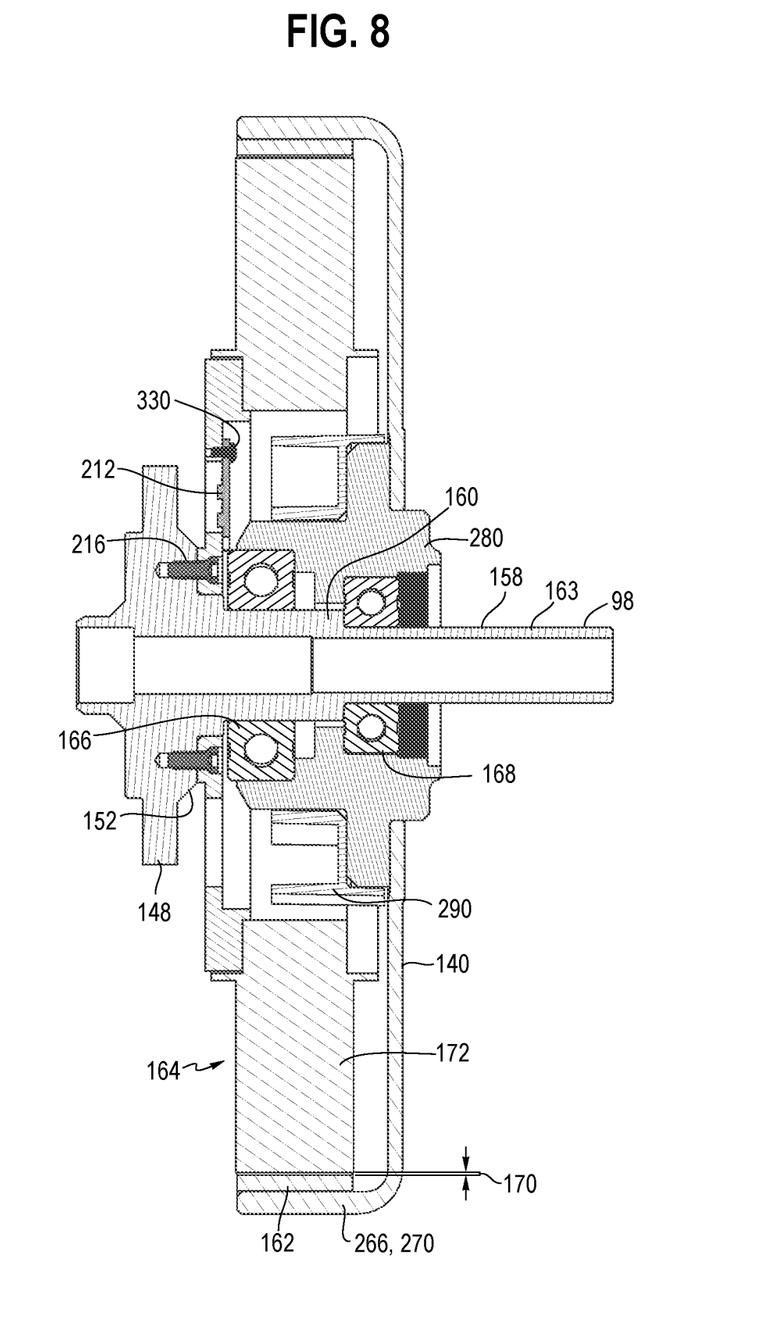
FIG. 8 is a cross-sectional view of a portion of the bicycle trainer shown in FIG. 2.

Referring to FIGS. 2-9A, the trainer 100 includes an electric generator resistance device 360, or drive unit, which primarily includes several parts, for example, the rotor 140, configured with fixed magnets 162, a stator 164 configured with variable strength electromagnets 172, and the axle 98, configured with bearings 166, 168 to support the rotor 140 and rotation thereof about the rotation axis 4. As shown in FIGS. 6 and 7, a cover 340 may be connected to the frame to cover the drive unit 360, and the stator 164 in particular. The rotor 140 of the generator receives a rider's mechanical input through the bicycle drive train 64. For example, the front drive train 64, including the pedals 76, crank arms 75, and drive wheels or sprockets 78 70, are connected using the continuous drive chain 68 or belt to a driven resistance application system of the bicycle trainer. In the embodiments herein, the resistance application system includes the electric generator type resistance device, but may also include an eddy brake system. The rotor includes at least one permanent magnet, and may include a plurality of permanent magnets 162 as shown in FIGS. 3, 5 and 7, which are separated from the stator by a small air gap 170. The rotor 140 rotates around the stator 164, which is stationary and is rotationally fixed to the frame 104. The interaction of the moving permanent magnets 162 on the rotor 140 to the stationary electromagnets 172 on the stator creates the resistance that the rider experiences through the drive train. Control of the energy provided to the electromagnets 172 of the stator 164 allows for control of the resistance provided to the rider through the drive train. This load path allows for direct torque measurement at the interface of the frame 104 and the stator 164, which will allow accurate user power input calculation when paired with the user cadence.

In the illustrated embodiment, the stator 164 is non-rotatably connected to the frame 104 with a torque cell 154. The torque cell 154 includes a carrier 174 having an inner fixation portion 176 non-rotatably fixed to the base 102, or frame 104 portion thereof, for example in one embodiment by way of the axle 98. The torque cell 154, and inner portion, or fixation portion 176, have a central axis coinciding with the rotation axis 4 defined by the axle 98. It should be understood that the torque cell 154, or carrier 174, may be directly attached to the frame 104, for example by securing the inner fixation portion 176 directly to the plate 112 with fasteners, tabs, welding or other fastening systems. The torque cell 154, or carrier 174, includes an outer portion 178 radially spaced from the inner portion 176 and a face member 180 extending radially between the inner portion and the outer portion. The outer portion 178 is connected to the stator 164, for example to one side of an inner ring 182 of the stator, which defines an interior cavity 184. In one embodiment, the face member 180 is defined by an annular web 186 positioned orthogonal to the rotation axis 4. The face member 180 may have opposite inner and outer surfaces. The annular web 186 includes a strain measurement section 188, defined for example between the inner and outer portions 176, 178. The strain measurement section includes one or more strain measurement features 190, which may be circumferentially spaced. In one embodiment, the strain measurement features 190 are formed in the radial strain zone between the stator 164 and the frame attachment location, for example between the inner and outer portions 176, 178, to provide for positioning of strain measurement devices 192 to detect and/or quantify mechanical deformations of the radial strain zone due to torque applied between the radially outer electromagnets 172 of the stator and the radially inner frame attachment portion 176. For example, the strain measurement devices 192 may be electrical resistance type shear strain gauges 194 attached to the strain measurement features 190. The strain measurement devices 192 may be attached to either side (inner or outer surface) of the face member 180. When attached to an inner or interior surface, the strain measurement device may be protected, which may prevent the device from being damaged. In one embodiment, shown for example in FIG. 11, the shear strain gauges 194 are configured as a conductive strip 196 defining parallel grid lines 198, wherein the grid lines are oriented at an acute angle $\alpha$ between 30 and 60 degrees relative to a radius, or radial line 203 extending radially from the rotation axis 4. In one embodiment, the angle $\alpha$ is 45 degrees. In one embodiment, the shear strain gauge 194 is configured to measure a maximum torque applied by the rotor 140 to the stator 164 of 120 Nm or less, and in one embodiment, the shear strain gauge is configured to measure a maximum torque of 80 Nm or less.

In the illustrated embodiment, the strain measure features 190 are isolated radially outward extending features connected the radially inner and outer parts. The isolated radially outward extending features 190 may be circumferentially separated by vacancies, which may be through openings 200 or recesses, and form spokes between the circumferentially spaced openings 200. In an embodiment, the carrier 174 is connectable to the frame 104 and the stator 164 and includes the strain measurement zone. The carrier 174 may also include associated circuitry 210 for the processing of gauge signals to output a torque signal proportional to the torque applied across the carrier. In an embodiment, the carrier 174 is sized and shaped to attach to the electromagnet carrying portion of the stator 164 using fasteners such as bolts, rivets, etc. In another embodiment, the strain measurement section, or carrier 174, may be integrally formed, or otherwise permanently attached, as a portion of the stator 164.

The stator 164 is non-rotatably affixed to the frame 104 through one or more connections. For example, in one embodiment, the axle 98 that supports the rotor bearings 166, 168 is bolted to the trainer frame 104. The torque cell 154 with strain gages 194 wired to a printed circuit board assembly ("PCBA") 212 is then connected to the axle 98 and the stator 164, for example with bolts or screws 216, 214.

This torque cell 154 not only supports the stator 164 to maintain the small air gap 170 necessary for the rotor 140 to turn freely about the axis 4, but also may measure the torque that is being resisted in the generator. In the illustrated embodiments the torque cell 154 is attached to the stator radially between the stator 164 and the trainer frame 104 attachment in a carrier arrangement. Fasteners 214, 216 are used for this attachment in the illustrated embodiments. In other embodiments the torque cell 154 may be permanently attached to the stator 164, for example by welding or adhesives, or formed with the stator as a single, integral piece.

Figure 11:
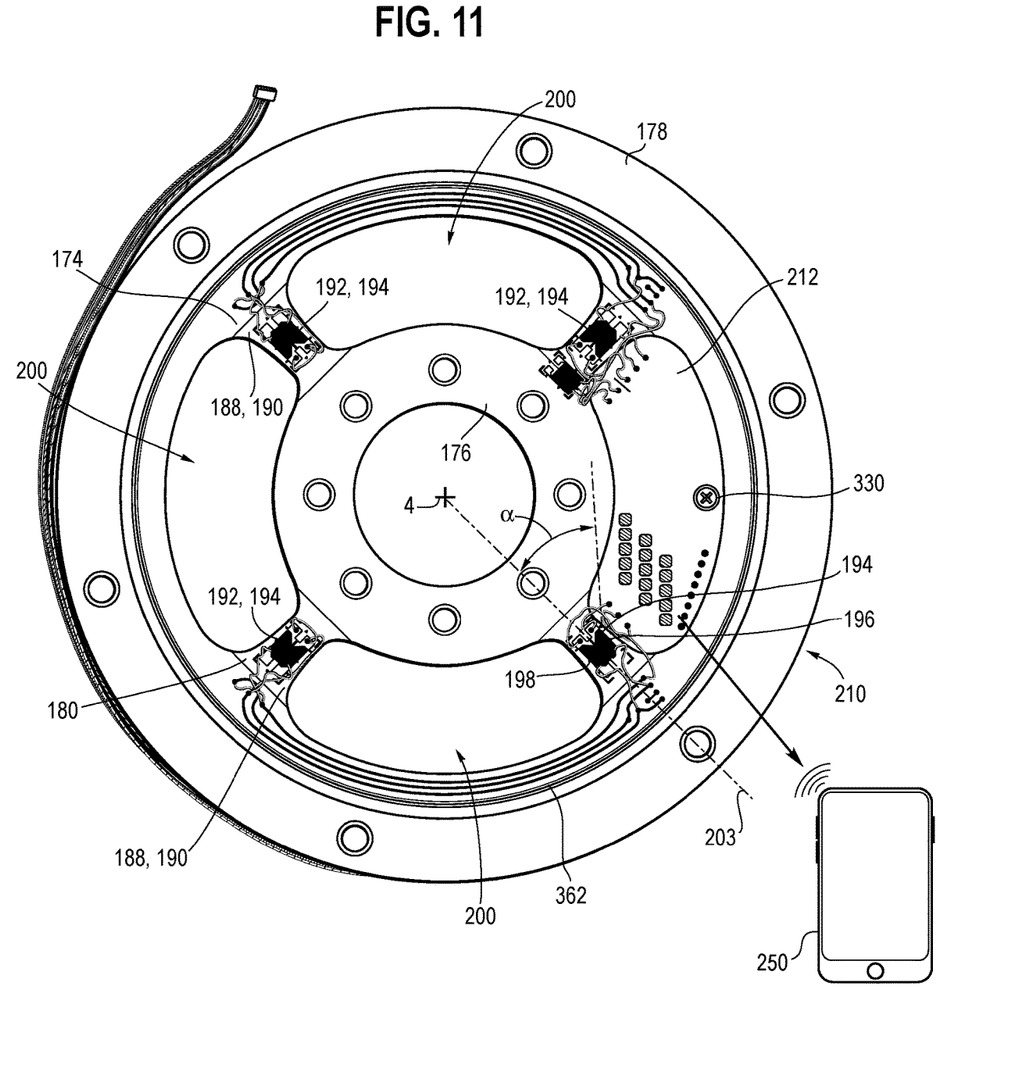
FIG. 11 is a side view of a portion of another embodiment of a torque cell.

In the illustrated embodiments, the torque cell 154 uses shear strain gages 194 to measure the torque applied through the stator 164 of the resistance application device for the trainer. In the displayed embodiment, the PCBA 212, with circuitry, is configured to process signals provided by the shear strain gauges 194 to provide a torque signal proportional to a measured torque through the torque cell 154. The strain gauges may be connected to the PCBA with electrical connectors 362, e.g., wires, as shown in FIG. 11. The PCBA may be secured to the torque cell in such way that it does absorb any shear, for example as being disposed over one of the openings and secured with a single fastener 330. In the illustrated configuration, four shear strain gauges 194, each with two measurement grids 198, are oriented 90 degrees apart on the torque cell 154 to provide 4-fold radial symmetry around the generator axis 4. It is possible that fewer gauges may be used. For example, in one embodiment, a single shear strain gauge 194 may be used. Four strain gauges 194 may allow for a more robust measurement by providing for two separate measurement circuits with two opposing gauges in one measurement circuit, and another two opposing gauges another measurement circuit. This redundancy may provide additional confidence in measurement accuracy by being allowing for a measured torque comparison between the measurement circuits. Alternatively, all four strain gauges 194 may be used in the same measurement circuit with no redundancy. Such a system may be useful in a system with consistently variable torque application throughout a revolution of a rotor.

The resistance device includes electronics that may also include a printed circuit board ("PCB"), for example the PCBA supported by the illustrated torque cell. The PCB may include, support, and/or electrically connect any number of electronic components including, for example, a processor, a memory, one or more communication devices (e.g., a wireless transmitter, antennas), and/or other electronic components. The processor may be in communication with electronic components 250 (e.g., one or more communication devices). The electronic components may be internal and disposed on the trainer device, or the electronic components 250 may be external of the trainer, for example disposed on a handlebar assembly of a bicycle coupled or otherwise paired with the smart trainer device. The one or more communication devices of the resistance device may be paired with the one or more communication devices of the handlebar assembly and/or other modules of the trainer, or may be a smart phone, tablet and/or other computer. Power and/or data may be supplied to the trainer through a plug or terminal end 310. For example and without limitation, power may be supplied through a terminal end 310, whereas data may be transmitted wirelessly, or through an ethernet port and/or USB-C port, which may be arranged on the PCBA.

As shown in FIGS. 9A and 9B, the rotor 140 includes a shell 260 configured with a face member 262 extending radially between an inner portion 264 and an outer portion 266, with the face member being axially spaced from the face member 180 of the torque cell 154. In one embodiment, the face member 262 is defined by an annular web 268 positioned orthogonal to the rotation axis 4. The rotor 140 further includes a circumferential flange 270 that extends orthogonal to the annular web and surrounds the stator, and further defines the outer portion 266. At least one magnet 162, and in one embodiment a plurality of permanent magnets 162, are connected to an inner surface 272 of, and supported by, the flange 270 in a radially spaced relationship to the stator electromagnets 172. In one embodiment, the rotor 140 includes a hub 280 connected to the inner portion 264 of the shell, for example with a plurality of fasteners 282. In other embodiments, the shell and hub may be integrally formed. The hub 280 is supported on the first and second portions 160, 163 of the axle shaft 158 with the bearings 166, 168. A fan 290 is connected to the hub 280 and rotates with the rotor 140 in the interior cavity 184 of the stator. The fan 290 rotates the same speed as the rotor to help draw air through the stator 164 for cooling. As noted above, the cassette 70 is non-rotatably fixed to the rotor 140, for example by way of a spline 312 attached to the rotor, and is rotatably supported by the axle 98, such that rotation of the cassette 70 by way of the user input to the drive train 64 thereby rotates the cassette 70 and rotor 140 about the rotation axis 40. In other embodiments, the cassette may non-rotatably fixed to the axle, which is rotatably supported by the frame, for example where the torque cell is directly connected to the frame.

In one embodiment, shown in FIG. 9B, the annular web 291, which defines a face member 300, may include a strain measurement section 292, defined for example between the inner and outer portions 264, 266. The strain measurement section may also include one or more strain measurement features 298. In one embodiment, the strain measurement features are formed in the radial strain zone between the axle 98 and the permanent magnets 162, for example between the inner and outer portions 264, 266, to provide for positioning of strain measurement devices 192 to detect and/or quantify mechanical deformations of the radial strain zone due to torque applied between the radially inner portion 264 connected to the cassette and the radially outer magnets 162, which are acted upon by the stator electromagnets 172. For example, the strain measurement devices may be electrical resistance type shear strain gauges 194 attached to the strain measurement features. In other embodiments, the face member 300 may not include any strain measurement features, rather the strain measurement devices 192 are simply applied to the face member. It should be understood that in any of the embodiments, the strain measurement devices may be applied to the inner or outer surface of the face member 300.

In yet another embodiment, both the torque cell 154 and the rotor 140 may be configured with strain measurement devices 192 that provide torque information. Also, it should be understood that the system and bicycle trainer, having a non-rotatable component with electromagnets, a rotatable component with a magnet rotatable relative to the non-rotatable component, and strain measurement devices, e.g., shear strain gauges, may encompass eddy current brake systems, as well as electric generator trainers.

The processor of the resistance device or trainer may determine a power to be provided by a power source to the electromagnets 172 of the stator of the resistance device to control the resistance provided to the drivetrain.

For example, the processor may determine the power to be provided based on a user input (e.g., generated in response to the user pressing a resistance up button at the handlebar assembly or other user interface) and instruct a communication device electrically connected to the processor via the PCB to transmit the determined power to a communication device (e.g., a wireless transmitter, antennas) associated with the source and/or a controller configured to control current to the electromagnet. The amount of rotational resistance may thus be controlled based on user input at, for example, the handlebar assembly or other user interface, or through other programs or devices to provide a desired resistance profile.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bicycle trainer comprising:
a base defining a rotation axis;
a carrier having an inner portion non-rotatably fixed to the base, an outer portion radially spaced from the inner portion and a first face member extending radially between the inner portion and the outer portion;
a stator connected to the outer portion of the carrier and comprising a plurality of circumferentially spaced electromagnets radially spaced from the rotation axis;
a rotor rotatably mounted to the base, wherein the rotor comprises at least one magnet disposed radially outward of the electromagnets and a second face member axially spaced from the first face member, and wherein the rotor is rotatable relative to the stator about the rotation axis; and
at least one strain measurement device disposed on one of the first face member and/or the second face member;
wherein the at least one strain measurement device comprises at least one shear strain gauge disposed on the first face member.

2. The bicycle trainer of claim 1, wherein the first face member is defined by an annular web positioned orthogonal to the rotation axis.

3. The bicycle trainer of claim 2, wherein the annular web comprises at least one strain measurement feature, wherein the at least one shear strain gauge is disposed on the at least one strain measurement feature.

4. The bicycle trainer of claim 3, wherein the annular web comprises a plurality of circumferentially spaced strain measurement features, and wherein the at least one shear strain gauge comprises a plurality of shear strain gauges disposed respectively on the plurality of strain measurement features.

5. The bicycle trainer of claim 4, wherein the plurality of strain measurement features comprise a plurality of spokes defined between circumferentially spaced openings.

6. The bicycle trainer of claim 4, wherein the plurality of shear strain gauges is arranged in separate first and second measurement circuits, wherein each of the first and second measurement circuits comprises at least a pair of the shear strain gauges.

7. The bicycle trainer of claim 1, wherein the base comprises an axle defining the rotation axis, wherein the carrier is connected to the axle, and wherein the rotor is rotatably supported by the axle.

8. The bicycle trainer of claim 1, wherein the shear strain gauge is configured to measure a maximum torque applied by the rotor to the stator of 120 Nm or less.

9. The bicycle trainer of claim 1, further comprising a printed circuit board assembly mounted on the carrier and/or the rotor and electrically connected to the at least one shear strain gauge, wherein the printed circuit board assembly is configured to process a signal provided by the at least one shear strain gauge to provide a torque signal proportional to a measured torque of applied by the rotor to the carrier.

10. A bicycle trainer comprising:
   a base defining a rotation axis;
   a carrier having an inner portion non-rotatably fixed to the base, an outer portion radially spaced from the inner portion and a first face member extending radially between the inner portion and the outer portion;
   a stator connected to the outer portion of the carrier and comprising a plurality of circumferentially spaced electromagnets radially spaced from the rotation axis;
   a rotor rotatably mounted to the base, wherein the rotor comprises at least one magnet disposed radially outward of the electromagnets and a second face member axially spaced from the first face member, and wherein the rotor is rotatable relative to the stator about the rotation axis; and
   at least one strain measurement device disposed on one of the first face member and/or the second face member;
   wherein the at least one strain measurement device comprises at least one shear strain gauge including a conductive strip defining parallel grid lines, wherein the grid lines are oriented at an acute angle between 30 and 60 degrees relative to a line extending radially from the rotation axis.

11. A bicycle trainer comprising:
   a base comprising a frame and an axle, the axle comprising a first hub, wherein the axle defines a rotation axis and the axle is non-rotatably fixed to the frame;
   a carrier connected to the axle having an inner portion non-rotatably fixed to the base, an outer portion radially spaced from the inner portion and a first face member extending radially between the inner portion and the outer portion, wherein the inner portion of the carrier comprises a second hub non-rotatably connected to the first hub;
   a stator connected to the outer portion of the carrier and comprising a plurality of circumferentially spaced electromagnets radially spaced from the rotation axis;
   a rotor rotatably mounted to the base and rotatably supported by the axle, wherein the rotor comprises at least one magnet disposed radially outward of the electromagnets and a second face member axially spaced from the first face member, and wherein the rotor is rotatable relative to the stator about the rotation axis; and
   at least one strain measurement device disposed on one of the first face member and/or the second face member.

* * * * *